United States Patent Office 3,525,467
Patented Aug. 25, 1970

3,525,467
NON-SLIP PLASTIC ARTICLES
Richard J. Bennett, Duane W. Gagle, Homer L. Draper, and Dale F. Levy, Bartlesville, Okla., assignors to Phillips Petroleum Company, a corporation of Delaware
No Drawing. Filed Oct. 18, 1967, Ser. No. 676,072
Int. Cl. B65d 31/00; B44d 1/094; B32b 27/32
U.S. Cl. 229—53
7 Claims

ABSTRACT OF THE DISCLOSURE

A slick surface plastic sheet or film useful for fabricating into bags or other articles is treated on at least a portion of the surface with an anti-slip agent such as asphalt or other tacky material in which, optionally, grit or other granular friction materials are embedded to prevent filled, stacked bags, for example, from slipping.

BACKGROUND OF THE INVENTION

Thermoplastic resins or polymers such as polyvinyl acetate, pollvinyl chloride polystyrene, polyethylene, polypropylene, and mixtures thereof, among others, have been fabricated into a wide variety of articles and non-rigid or flexible films or sheets as well as many other applications. Sheets or films fabricated from such thermoplastic resins possess the inherent disadvantage of having an extremely slippery surface which restricts their use in a number of applications. For example, when the films are fabricated into containers such as bags the containers slip and slide against each other when being transported by hand, truck, motor vehicles, rail carriers, water carriers, and the like, and are difficult to store in stacks and often slide when in storage. This phenomenon results in shifting of loads, spillage, loss of containers from moving vehicles and accidents to handling and warehouse personnel.

Use of sandbags for both military and civilian purposes is widespread. A major deficiency in bags of natural fibers is their susceptibility to fire or degradation. This is overcome by plastics which have entered this market primarily by using woven flat film. Such woven material is used to provide a bag that can be stacked and remain stable in the stack. A plain film bag is too slick, especially when wet, to compete on stability with woven plastic or natural fibers.

Attempts have been made heretofore to overcome the difficulty of the slippery surface of thermoplastic resin or polymer films without otherwise adversely altering one or more of the properties of the film. These attempts have been largely unsuccessful. Non-skid coatings normally used are relatively expensive.

The present invention relates to treated or coated sheets or films fabricated from thermoplastic resins or polymers and particularly to treated or coated sheet or films which have a slip-resistant surface. In accordance with another aspect, this invention relates to methods of treating the surfaces of normally slippery thermoplastic resin or polymer sheets or films to render such surfaces slip-resistant. In accordance with a further aspect, this invention relates more particularly to treated or coated polyolefin sheets or films which are characterized by slip-resistant surface. In accordance with a still further aspect, this invention relates to improved packaging containers fabricated from thermoplastic resin sheets or films, which containers are characterized in having a slip-resistant surface.

Accordingly, an object of this invention is to provide thermoplastic polymer films and sheets which are characterized in having a slip-resistant surface.

Another object of this invention is to provide an inexpensive non-skid surface for thermoplastic polymer films and sheets.

Another object of this invention is to provide improved slip-resistant packaging containers fabricated from thermoplastic resins or polymers having slip-resistant surfaces.

Other objects and aspects, as well as the several advantages of the invention, will be apparent to those skilled in the art upon reading the specification and the appended claims.

SUMMARY OF THE INVENTION

In accordance with the invention, an inexpensive non-skid surface is provided on plastic films and sheets as well as other plastic surfaces by coating with a tacky material such as asphalt either with or without the inclusion of granular frictional material.

In accordance with one embodiment of the invention, a slick surface plastic bag is treated with an anti-slip agent such as asphalt or other tacky material in which, optionally, grit or other finely divided particulate materials are imbedded to prevent filled, stacked bags from slipping.

The present invention is based on the discovery that the slippery surface of rigid, semi-rigid, or flexible thermoplastic resin sheets or films or other substrates having an outer coating or film of such thermoplastic resin or polymer thereon can be rendered slip-resistant when coated with a material comprising asphalt.

In accordance with another embodiment of the invention, polyolefin bagging material is given a stripe or patterned surface of an asphalt emulsion to which optionally finely divided aggregate or other granular frictional material can be added to prevent slippage.

In accordance with a further embodiment of the invention, the asphalt or other tacky substance coating can be dusted with talc or other dusting powders for easier separation of the sheets or films without affecting the anti-slip properties.

The treated thermoplastic resin films or sheets or other articles of the invention are useful for sandbags, ground cover and, in addition, the invention has other applications including utility as film containers for earth construction. Such areas as road construction, embankments, dams and buildings are within the scope of the utility of the slip-resistant thermoplastic resins sheets and films of the invention.

DESCRIPTION OF THE PREFERRED EMBODIMENTS

The thermoplastic resin or polymer sheets which can be made slip-resistant in accordance with the present invention are fabricated by processes well known in the art such as, for example, by molding or extrusion processes. The thermoplastic polymer sheets which are fabricated by molding processes are generally rigid or semi-rigid or flexible and usually have thicknesses of $\frac{1}{32}$ of an inch or greater whereas thermoplastic polymer sheets which are fabricated by extrusion processes are usually flexible and generally have thicknesses of from 0.5 mil to $\frac{1}{16}$ of an inch. Such sheets may be transparent or translucent, depending upon the character of thermoplastic polymer, and the surface of such sheets is almost always extremely slippery and in any event is too slippery for many uses. Such thermoplastic polymers can also occur as sheets or films which have been sprayed or other sheeted material, for example, paper, and the thickness of such thermoplastic sheets is usually less than 1.0 mil.

The coating compositions used in this invention can be employed to impart slip-resistant properties to a wide variety of sheets or films fabricated from the herein referred to thermoplastic resins or polymers or to, for example, cellulosic sheets such as paper which have on their outer surface a coating or film of such thermoplastic resins or polymers.

The surfaces of molded or extruded sheets fabricated from polyvinyl acetate, polyvinyl chloride, polystyrene, polyethylene, polypropylene and the like can be made slip-resistant when a coating of asphalt or other tacky substance is applied to such sheets and the coating allowed to dry, for example, by heating at an elevated temperature. The invention is particularly applicable to the polyolefin films or sheets, particularly polyethylene and polypropylene films or sheets, for fabrication into packing containers. The packaging containers that can be formed from the films or sheets coated according to the invention can be single-wall or multi-wall packaging containers.

In the case of single-wall packaging containers, such containers can be fabricated directly from the coated thermoplastic polymer sheets of this invention or such containers can be fabricated from uncoated thermoplastic polymer sheets to which the coating can be applied by brushing, spraying, or the like after the packaging container has been fabricated.

The asphalts used in the preparation of the coatings of the invention include any of those bituminous material used heretofore and known in the prior are, such as natural asphalts or those derived from petroleum refining, for example, by steam refining and/or air blowing and the like. Asphalts characterized by penetrations (ASTM D-5-51) from 0 to about 300 or even higher, and preferably from about 40 to about 300, and having softening points (ASTM D-36-26) in the range of 90 to 250° F., preferably 100 to 150° F., represent suitable asphalts that can be employed.

The asphalts can be applied to the thermoplastic resins or sheets as an asphalt melt or as an asphalt emulsion.

The asphalt emulsions that can be employed can be cationic, anionic, amphoteric, or nonionic or mixtures thereof and can be prepared by any method suitable and known to those skilled in the art.

The relative amounts of the various components of the asphalt emulsions when employed can vary, but in general the asphalt is present in the amount of from 20 to 70 weight percent; emulsifiers present in an amount in the range of 0.1 to 5 weight percent; and water present in an amount between 75 and 25 weight percent based on the total blend.

The thermoplastic films or sheets can be treated with the aforementioned asphaltic coating compositions in a variety of ways, for example, by spraying, brushing, or rolling. The resulting coating can then be air dried, or heat dried, as required. The coatings when dried can be continuous or discontinuous and are generally patterned or discontinuous adherent films. As indicated above, the asphaltic materials can be applied as a hot melt, but with some thermoplastic resins this presents a disadvantage in that the resin may melt. In the presently preferred application, the asphalt is applied as an emulsion and, therefore, can be applied at somewhat lower temperatures.

The asphaltic coating composition can contain finely-divided particulate materials which function as frictional materials such as sand, diatomaceous earth, ground chalk, and the like.

It is also within the scope of the invention to dust the asphaltic surface with talc and other dusting materials. Other dusting materials that can be employed include powdered gypsum, powdered magnesia, rock dust, and the like.

If unitizing of a stack of bags containing the asphaltic coatings of the invention is desired, one can soften the asphalt coating with a solvent such as gasoline prior to stacking of the bags.

Example I

Lay flat tubing 10 mil thick was extruded on conventional equipment from high density polyethylene having a density of 0.940 and a melt index of 0.2 (ASTM 1238-62T). Strips of suitable length (about 30 in.) were edge sealed to make test bags. An anionic asphalt emulsion was prepared to SS-1 specifications (American Association of State Highway Officials M-140). Dilutions with water were made to produce emulsions containing 5, 10, 15, 20, 40 and 50 percent solids. Bags were coated manually with longitudinal strips 2 inches wide at 3 inch intervals with these emulsions. Bags coated with 20, 40 and 50 percent solids asphalt emulsions, respectively, filled with 50 pounds sand were stacked to a height of 5 feet; these stacks were stable and the bags showed no tendency to slip. Stacks made from uncoated plastic bags showed a tendency to slip out of alignment under their own weight.

Example II

Bags made as in Example I were strip coated with a 40 percent solids emulsion prepared as in Example I to which 5 weight percent of 200 mesh sand had been added. Sand filled bags could be stacked to a height of 5 feet without slippage.

We claim:
1. A packaging container comprising at least one wall having a base and a non-slip surface coating thereon comprising a thermoplastic resin sheet substrate base coated on a portion of at least one side thereof with a thin layer of tacky asphaltic material which forms said non-slip surface.
2. An article according to claim 1 wherein the asphaltic material is applied as a patterned coating on one side of said sheet.
3. A non-slip bag formed from the coated base according to claim 1 wherein the asphaltic material coating is on the outside surfaces of the bag.
4. An article according to claim 1 wherein said sheet is polyolefin.
5. An article according to claim 1 wherein the layer of asphaltic material contains finely-divided solids dispersed therein as additional frictional material.
6. An article according to claim 1 wherein the outer surface of said asphaltic layer is dusted with finely-divided talc to prevent sticking to layers of other coated bases coming into contact therewith without affecting anti-slip properties.
7. An article according to claim 1 wherein said sheet is polyethylene and said asphaltic material is characterized by a penetration (ASTM D-5-51) of from 0 to about 300 and a softening point (ASTM D-36-26) in the range of 90 to 250° F.

References Cited

UNITED STATES PATENTS

| 1,962,660 | 6/1934 | Keller. |
| 2,043,110 | 6/1936 | McLaurin. |
| 2,964,424 | 12/1960 | Mast. |
| 3,008,863 | 11/1961 | Morris et al. |
| 3,246,831 | 4/1966 | Teicher. |
| 2,033,928 | 3/1936 | Driscoll et al. |
| 3,257,336 | 6/1966 | Levy et al. |

FOREIGN PATENTS 677,301    12/1963    Canada.

WILLIAM D. MARTIN, Primary Examiner

R. M. SPEER, Examiner

U.S. Cl. X.R.

117—18, 32, 37, 92, 94, 138.8